July 16, 1968  L. H. CAVENY  3,392,524
TUBE BURNING RATE SENSOR FOR SOLID PROPELLANT
BACK BLEED TUBE ROCKET MOTORS
Filed June 23, 1966  2 Sheets-Sheet 1
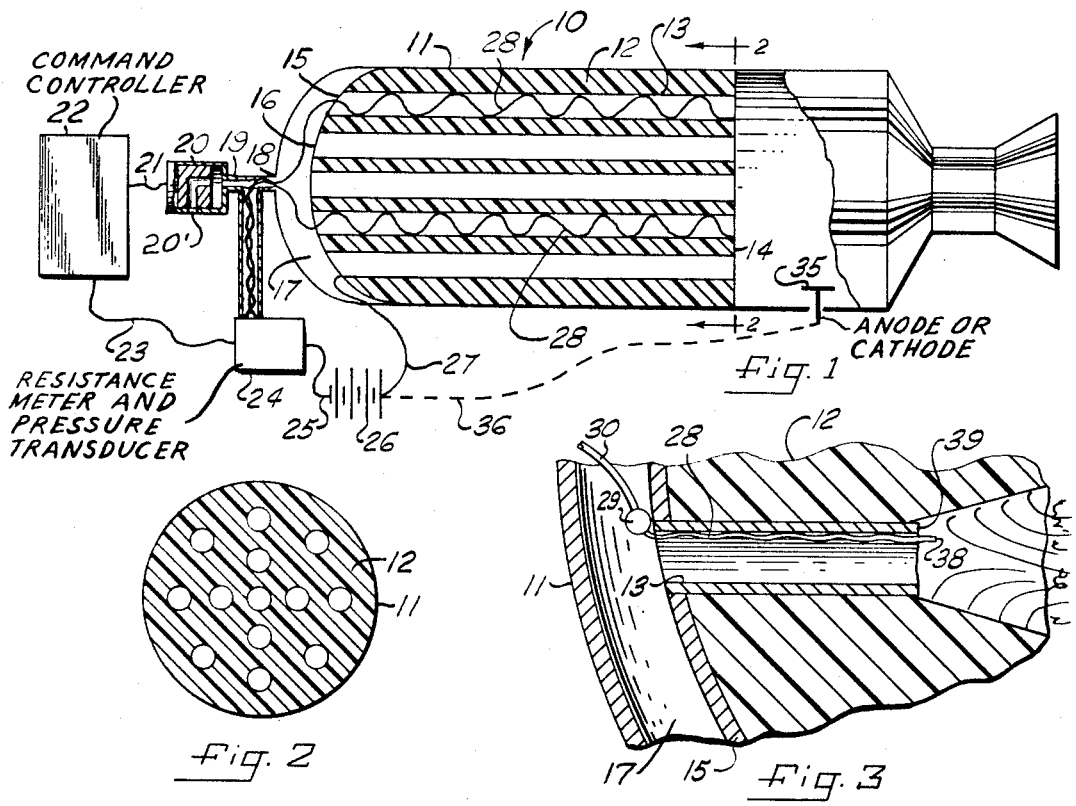
Leonard H. Caveny INVENTOR.
ATTORNEY July 16, 1968
L. H. CAVENY
3,392,524
TUBE BURNING RATE SENSOR FOR SOLID PROPELLANT
BACK BLEED TUBE ROCKET MOTORS
Filed June 23, 1966
2 Sheets-Sheet 2
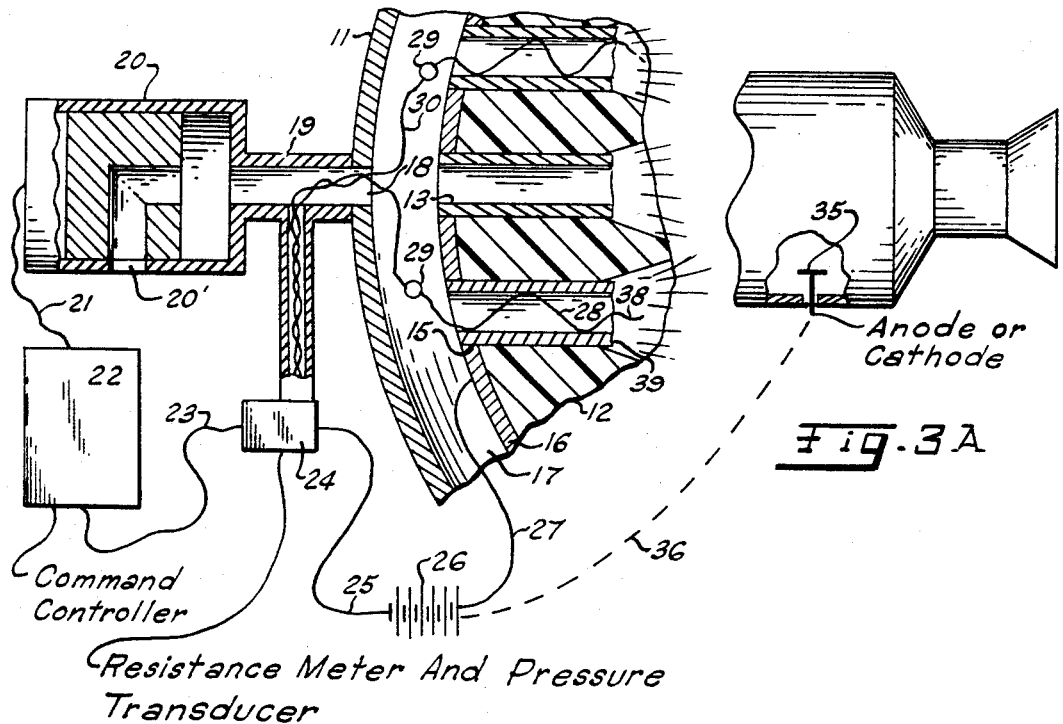
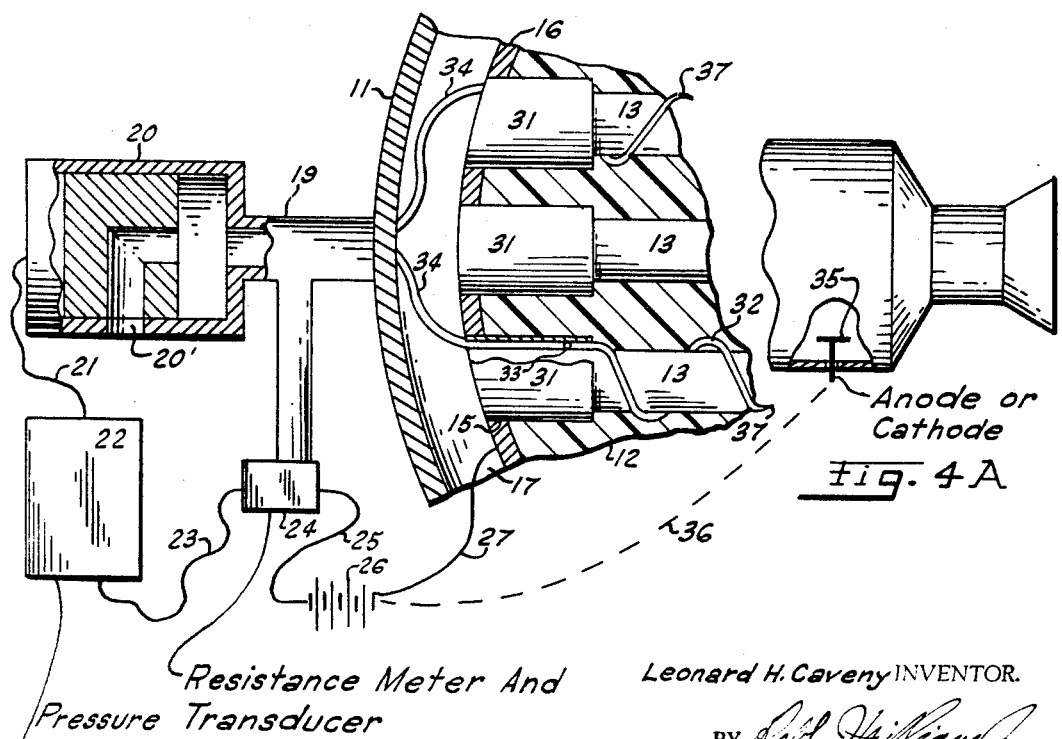
Leonard H. Caveny INVENTOR.
BY
ATTORNEY United States Patent Office 3,392,524
Patented July 16, 1968

3,392,524
TUBE BURNING RATE SENSOR FOR SOLID PROPELLANT BACK BLEED TUBE ROCKET MOTORS
Leonard H. Caveny, Huntsville, Ala., assignor to Thiokol Chemical Corporation, Bristol, Pa., a corporation of Delaware
Filed June 23, 1966, Ser. No. 559,876
8 Claims. (Cl. 60—39.47)

ABSTRACT OF THE DISCLOSURE

A tube burning rate sensor for solid propellant rocket motors having combustible tubes embedded in the solid propellant in the rocket motor including a sensing element mounted in one or more tubes and having control and indicating mechanisms connected thereto to sense the burning rate of the burning surface of the solid propellant and the pressure in the rocket motor and compare it will the burning rate of the tubes.

---

This invention relates to improvements in burning rate sensors and more particularly to a burning rate sensor that is utilized to measure the burning rate along a combustible metallic tube that is embedded in the solid propellant in a rocket motor.

The type of solid propellant rocket motor that utilizes the tube burning rate sensor embodying the instant invention, is clearly disclosed in copending application Ser. No. 403,554, filed October 13, 1964, and provides a solid propellant rocket motor whereby the rate of gas generation within the solid propellant rocket motor is controlled by varying the localized propellant burning rate at selected points to cause variations in the burning surface area of the solid propellant. This procedure is achieved by embedding within the solid propellant in the rocket motor, metallic combustible tubes which control the localized burning rate adjacent to such tubes.

The burning of the solid propellant within the combustion chamber of the rocket motor, creates hot combustion gases, a portion of which bleed back or flow back from the combustion chamber to the head end of the rocket motor, for the purpose of regulating the burning rate of the tubes.

It has been determined that the rate of combustion of the tubes during the burning of the solid propellant should be controlled to remove the problems associated with any time lags between changes in the burning rate along the tubes and any changes in the motor pressure within the combustion chamber.

The instant invention, therefore, was developed to measure the instantaneous burning rate along the tubes as it varies with the rate of the combustion gases bleeding through the tubes and the pressure within the combustion chamber of the rocket motor.

Since equilibrium pressure in the combustion chamber of the rocket motor can be accurately predicted in terms of equilibrium burning rate along the tubes, the tube burning rate sensor will be associated with an instrument that measures electrical resistance, so that the instrument will distinguish between the desired burning rate along the tubes and instantaneous measured burning rate along the tubes.

It is an object of this invention, therefore, to provide a tube burning rate sensor that will measure the burning rate along the tubes and the changes in the pressure level within the combustion chamber of the rocket motor and indicate changes that should be made in the burning rate along the tubes to correspond to the desired pressure level within the combustion chamber.

Up to the present time the inability to measure the burning rate along the tubes prior to pressure changes within the combustion chamber of the rocket motor, results in the consumption of excessive lengths of the tubes, thus creating burned out areas of steep conical formations around the tubes, causing the burning surface of the solid propellant to become progressively larger, causing loss of control of the solid propellent rocket motor.

It is another object of the invention, therefore, to provide a tube burning rate sensor that is coupled with a control means for the rocket motor that will compare the instantaneous burning rate of the tubes with the desired burning rate of the solid propellant so that such burning rate can be controlled to compensate for any changes in the pressure within the combustion chamber of the rocket motor.

With the above and other objects and advantages in view, the invention consists of the novel details of construction, arrangement and combination of parts more fully hereinafter described, claimed and illustrated in the accompanying drawing, in which:

FIGURE 1 is a schematic view of a rocket motor to which the sensor embodying the invention may be applied;

FIGURE 2 is a schematic view on the line 2—2 of FIGURE 1;

FIGURE 3 is a detailed fragmentary sectional view showing one form of the invention as applied to the rocket motor of FIGURE 1;

FIGURE 3A is an enlarged detailed fragmentary sectional view illustrating the electrical circuitry for the form of the invention shown in FIGURE 3;

FIGURE 4 is a similar view showing another form of the invention as applied to the rocket motor of FIGURE 1; and FIGURE 4A is a view similar to FIGURE 3A illustrating the electrical circuitry for the form of the invention shown in FIGURE 4.

Referring more in detail to the drawing, wherein like parts are designated by like reference numerals and more particularly to FIGURES 1 to 3A, wherein the reference numeral 10 is used to designate a form of rocket motor to which the instant invention may be applied.

The rocket motor 10 comprises a motor case 11, wherein there is inclosed a solid propellant 12. The solid propellant 12 is of a conventional formulation that may be well-known to those skilled in the art.

A plurality of equally spaced metal tubes 13 are embedded in the solid propellant 12 with their aft ends terminating at the burning surface 14 of the solid propellant 12 and their fore ends being inserted in a plurality of openings 15 in a concavo-convex header plate 16 that is secured at its peripheral edge to the interior wall surface of the motor case 11 and thus forms a plenum chamber 17. The tubes 13, by reason of the openings 15 that are provided in the header plate 16, communicate directly with the plenum chamber 17.

The head end of the motor case 11 is provided with a medial opening 18 that communicates with one end of the cross-bar of a T-shaped conduit or coupling 19 and the latter may be formed integral with the head end of the motor case 11 or secured thereto by welding or the like.

A conventional control valve 20 is secured to the outer end of the cross-bar of the conduit 19 and is connected by an appropriate lead or leads 21 to a conventional command controller 22. The controller 22 is then in turn connected by an appropriate lead or leads 23 to a conventional electrical resistance meter and pressure transducer 24, which is connected to the outer end of the stem of the conduit 19 and is in turn connected by an appropriate lead or leads 25 to a battery 26.

In FIGURE 1 there is shown an appropriate lead or leads 27 extending from the battery 26 to be connected at their free ends by soldering or the like, to the header plate 16. Then to complete the system embodying the invention, electrically insulated burning rate sensor resistance elements 28 are positioned within the tubes 13 and extend longitudinally of the tubes 13 outwardly thereof through the conduit 19 to be connected at their free ends to the resistance meter and pressure transducer 24, and the resistance elements are electrically insulated from the tubes 13. As shown in FIGURES 3 and 3A, the elements 28 may terminate at a suitable coupling or connector 29 from which an appropriate lead 30 may extend to the resistance meter and pressure transducer 24.

In FIGURE 4 sleeves 31 may be extended into the opening 15 in the header plate 16 and the tubes 13 are extended into the sleeves 31 in fixed relation thereto. In this form of the invention, electrically insulated burning rate sensor resistance elements 32 are wrapped around the outer circumferential surface of the tubes 13 extending longitudinally of the tubes to terminate at a coupling or connector 33 that is secured to the sleeve 31, a suitable lead 34 will then extend from the sleeve 31 to the resistance meter and pressure transducer 24, and the resistance elements 32 are also electrically insulated from the tubes 13. Also an anode or cathode 35 may be positioned in the motor case 11 adjacent the burning surface 14 of the solid propellant 12 and an appropriate lead 36 may connect the anode 35 to the battery 26. The electrical circuit in this instance will then be made between the exposed end 37 of the elements 32 and the anode 35 by means of the ionized combustion gases that are created in the motor case 11 by the burning of the solid propellant 12. Also an electrical path could be created between the exposed end 38 of the elements 28 through the ionized combustion gases to the exposed end 39 of the tube 13, as in FIGURES 1, 3 and 3A. Thus the burning rate of the tube 13 and the elements 28 and 32 are sent as a signal to the controller 22. The controller 22 then compares the instantaneous burning rate to the desired burning rate and then causes the control valve 20 to operate to compensate for any error in pressure. Since the gas under pressure flows through the valve 20 from the conduit 19, the gas flow will pass through the valve 20 to be vented to the atmosphere through a port 20' to control the pressure after it has been sensed by the resistance meter and pressure transducer 24. Since the pressure in the plenum chamber 17 is fed directly to the resistance meter and pressure transducer 24 which in turn excites the electrical resistance therein, that is connected to the battery 26, and the elements 28, such electrical resistance will excite the command controller 22 to operate the valve 20 to vent the pressure to the atmosphere, if the pressure in the plenum chamber rises to excite the pressure transducer. Thus the combustion chamber pressure, the burn rates of the tube and the burn rates of the sensor elements are compared to control the burn rate of the tubes and sensor elements. The composition of the tubes is so determined that the burn rates of the tubes and the burn rates of the propellant are equalized as closely as it is possible under existing conditions. The burn rates of the sensors are also provided for by the composition of these elements, therefore because of prior analysis, the tubes, solid propellant and sensors will all be consumed at the same level. Thus if the pressure is sensed by the pressure transducer and the electrical resistance excites the command controller 22 the chamber pressure, the burn rates of the tubes, solid propellant and sensors will if the motor operates are previously determined carry out the requiirements of the inment invention.

It will also be understood that as the tubes 13 are consumed, the elements 28 and 32 will be consumed and it is known that the total electrical resistance of the elements 28 and 32 are directly proportional to their length and the length of the tubes 13 are directly proportional to the electrical resistance of the elements 28 and 32. The burning rate of the tubes 13 can be related to the rate of change of the electrical resistance of the elements 28 and 32 and any temperature effects on the electrical resistance can be accounted for and corrected. Since the tube burning rate and the pressure is sensed by the resistance meter and pressure transducer 24, and the desired chamber pressure and tube burning rate has been calculated and fed into the resistance meter and pressure transducer 24, any difference therein will be determined, due to the relationship of the burning rates of the tubes and sensors, and such difference will cause the command controller 22 to be excited, to control the valve 20. The electrical resistance meter and pressure transducer 24 is a conventional item and will operate in a manner such as has been programmed therein. It is pointed out that the sensor is used to transmit a signal so that the electrical resistance meter and pressure transducer 24 will operate to carry out the requirements of the present invention.

One or more of the elements 28 or 32 may be used to improve the over all reliability of the system. If several of the elements are used, their average resistance can be calculated to obtain an average burning rate and thus evaluate the burning rate of several tubes to determine if the burning rates along the tubes were uniform.

Thus by measuring the controlled burning rate along the tubes, more positive control of the burning rate of the rocket motor 10 can be maintained. The more positive control of the burning rate of the tubes will result in faster pressure response. The control system using the elements 28 and 32 will not require delay circuits to establish the pressure response as a function of the operation of the valve 20. The system will also prevent runaway conditions in the burning rate of the solid propellant 12 that would not be sensed by an instantaneous pressure rise in the motor case 11, thus such conditions can be detected before a catastrophic sequence in the burning rate of the solid propellant 12 can begin.

The elements 28 and 32 will also be inexpensive to fabricate and will add very little weight to the payload of the rocket motor 10.

As previously described, it is believed that the manner of operation of the invention will be clear to those skilled in the art and it is also to be understood that variations therein may be adhered to provided such variations fall within the spirit of the invention and the scope of the appended claims.

Having thus described the invention what is claimed as new is:

1. In a rocket motor having a combustion chamber and a solid propellant therein provided with a burning surface at the aft end thereof and combustible tubes embedded in the solid propellant and terminating at the burning surface thereof the improvement, comprising a burning rate sensor extending longitudinally through each of said tubes to sense the burning rate of the burning surface of the solid propellant, and means connected to said rocket motor and to said burning rate sensor to sense the pressure in said combustion chamber, so that the burning rate of said solid propellant can be compared with the burning rate of said tubes.

2. In a rocket motor having a combustion chamber and a solid propellant therein provided with a burning surface at the aft end thereof and combustible tubes embedded in the solid propellant and terminating at the burning surface thereof the improvement, comprising a burning rate sensor wrapped around the exterior surface of said tubes longitudinally thereof to sense the burning rate of the burning surface of the solid propellant, and means connected to said rocket motor and to said burning rate sensor to sense the pressure in said combustion chamber, so that the burning rate of said solid propellant can be compared with the burning rate of said tubes.

3. The improvement as in claim 1, wherein the means connected to said rocket motor and said burning rate sensor comprises an electrical resistance meter and pressure transducer that is connected to a battery and a command controller, a vent valve is in communication with said rocket motor to vent the pressure in said combustion chamber to the atmosphere and is connected to said command controller, whereby the operation of said valve to vent said combustion chamber is controlled by said command controller.

4. The improvement as in claim 2 wherein the means connected to said rocket motor and said burning rate sensor comprises an electrical resistance meter and pressure transducer that is connected to a battery and a command controller, a vent valve is in communication with said rocket motor to vent the pressure in said combustion chamber to the atmosphere and is connected to said command controller whereby the operation of said valve to vent said combustion chamber is controlled by said command controller.

5. The improvement as in claim 3, wherein a header plate is secured in said rocket motor at the head end of said solid propellant to provide a plenum chamber in said rocket motor and said battery is connected to said header plate.

6. The improvement as in claim 3, wherein an anode is mounted in said rocket motor to extend into said combustion chamber aft of the burning surface of said solid propellant and said anode is connected to said battery.

7. The improvement as in claim 1, wherein the ionized gases in said combustion chamber provide a circuit between the ends of said sensor and said tubes.

8. The improvement as in claim 5, wherein relatively spaced sleeves are mounted in said rocket motor and are connected to said header plate and the head end of said tubes are positioned in said sleeves and the free end of said sensor is connected to one of said sleeves.

References Cited
UNITED STATES PATENTS

| | | | |
|---|---|---|---|
| 3,073,112 | 1/1963 | Bleikamp | 60—254 XR |
| 3,097,481 | 7/1963 | Silver | 60—39.47 |
| 3,182,451 | 5/1965 | Messerly | 60—254 XR |
| 3,201,973 | 8/1965 | Fitzgerald et al. | 73—35 |
| 3,267,721 | 8/1966 | Jacobs et al. | 73—35 |
| 3,302,690 | 2/1967 | Meers | 73—35 |

CARLTON R. CROYLE, *Primary Examiner.*